US012493739B2

(12) United States Patent
Dumitrescu et al.

(10) Patent No.: US 12,493,739 B2
(45) Date of Patent: Dec. 9, 2025

(54) GENERATING FULL DESIGNS FROM TEXT

(71) Applicant: ADOBE INC., San Jose, CA (US)

(72) Inventors: Stefan Daniel Dumitrescu, Valencia (ES); Vlad-Constantin Lungu-Stan, Bucharest (RO); Ionut Mironica, Bucharest (RO); Oliver Brdiczka, San Jose, CA (US)

(73) Assignee: ADOBE INC., San Jose, CA (US)

( * ) Notice: Subject to any disclaimer, the term of this patent is extended or adjusted under 35 U.S.C. 154(b) by 164 days.

(21) Appl. No.: 18/477,978

(22) Filed: Sep. 29, 2023

(65) Prior Publication Data

US 2025/0111137 A1  Apr. 3, 2025

(51) Int. Cl.
*G06F 17/00* (2019.01)
*G06F 40/126* (2020.01)
*G06F 40/186* (2020.01)
*G06F 40/30* (2020.01)
*G06F 40/40* (2020.01)

(52) U.S. Cl.
CPC .......... *G06F 40/186* (2020.01); *G06F 40/126* (2020.01); *G06F 40/30* (2020.01); *G06F 40/40* (2020.01)

(58) Field of Classification Search
CPC ...... G06F 40/186; G06F 40/126; G06F 40/30; G06F 40/40; G06F 40/174
See application file for complete search history.

(56) References Cited

U.S. PATENT DOCUMENTS

| | | | |
|---|---|---|---|
| 8,037,408 B2 * | 10/2011 | Hartmann | G06F 40/143 |
| | | | 715/237 |
| 10,262,062 B2 * | 4/2019 | Chang | G06F 16/3329 |
| 10,339,373 B1 * | 7/2019 | Yellapragada | G06V 30/418 |
| 11,868,714 B2 * | 1/2024 | Modani | G06F 40/186 |
| 12,045,735 B1 * | 7/2024 | Parasnis | G06N 3/0475 |
| 2016/0357860 A1 * | 12/2016 | Shmiel | G06F 16/3329 |
| 2019/0251159 A1 * | 8/2019 | Guggilla | G06F 16/9017 |
| 2022/0309277 A1 * | 9/2022 | Shu | G06F 16/35 |

(Continued)

FOREIGN PATENT DOCUMENTS

| | | | | |
|---|---|---|---|---|
| CN | 112749536 A | * | 5/2021 | |
| CN | 114942990 A | * | 8/2022 | G06F 40/186 |

(Continued)

OTHER PUBLICATIONS

1Chung, et al., "Scaling Instruction-Finetuned Language Models", arXiv preprint arXiv:2210.11416v5 [cs.LG] Dec. 6, 2022, pp. 1-54.

(Continued)

*Primary Examiner* — Laurie A Ries
(74) *Attorney, Agent, or Firm* — F. CHAU & ASSOCIATES, LLC

(57) ABSTRACT

Systems and methods for generating full designs from text include retrieving a plurality of document templates based on a design prompt, and filtering the document templates based on an image prompt. A document template is then selected based on the filtering, and a document is generated based on the document template and the image prompt. Embodiments are further configured to generate content from one or more of the prompts, where the content is included in the final design document.

18 Claims, 8 Drawing Sheets

(56) References Cited

U.S. PATENT DOCUMENTS

| | | | |
|---|---|---|---|
| 2023/0095089 A1* | 3/2023 | Kaliyaperumal | G06V 10/235 715/762 |
| 2024/0152695 A1* | 5/2024 | Shukla | G06F 40/56 |
| 2024/0242037 A1* | 7/2024 | Heller | G06F 40/35 |
| 2024/0265274 A1* | 8/2024 | Parasnis | G06F 40/30 |
| 2024/0320444 A1* | 9/2024 | Maschmeyer | G06F 3/04845 |
| 2024/0427984 A1* | 12/2024 | Ragan | G06F 40/186 |
| 2025/0061284 A1* | 2/2025 | Downs | G06F 40/186 |
| 2025/0103771 A1* | 3/2025 | Radford | G06T 11/60 |

FOREIGN PATENT DOCUMENTS

| | | | |
|---|---|---|---|
| CN | 117313670 A * | 12/2023 | G06F 16/353 |
| CN | 117493558 A * | 2/2024 | G06F 16/35 |
| WO | WO-2025136437 A2 * | 6/2025 | G06F 40/30 |

OTHER PUBLICATIONS

2Li, et al., "BLIP-2: Bootstrapping Language-Image Pre-training with Frozen Image Encoders and Large Language Models", arXiv preprint arXiv:2301.12597v3 [cs.CV] Jun. 15, 2023, found on the internet at https://github.com/salesforce/LAVIS/tree/main/projects/blip2, 13 pages.

3Radford, et al., "Learning Transferable Visual Models From Natural Language Supervision", arXiv preprint arXiv:2103.00020v1 [cs.CV] Feb. 26, 2021, 48 pages.

4Reimers, et al., "Sentence-BERT: Sentence Embeddings using Siamese BERT-Networks", arXiv preprint arXiv:1908.10084v1 [cs.CL] Aug. 27, 2019, 11 pages.

5Rombach, et al., "High-Resolution Image Synthesis with Latent Diffusion Models", arXiv preprint arXiv:2112.10752v2 [cs.CV] Apr. 13, 2022, pp. 1-45.

6Meng, et al., "SDEdit: Guided Image Synthesis and Editing with Stochastic Differential Equations", arXiv preprint arXiv:2108.01073v2 [cs.CV] Jan. 5, 2022, pp. 1-33.

* cited by examiner

Templates based on Design Prompt Only
400

Templates Including Generated Image
405

Templates Including User Provided Image
410

GENERATING FULL DESIGNS FROM TEXT

BACKGROUND

The following relates generally to document generation, and more specifically to generating design documents from text. Design documents combine visual and text elements on a canvas, and may be used for materials such as flyers, invitations, and informational documents. Methods for producing design documents involve searching for fitting design templates and then modifying them to meet project requirements. This can be time-consuming and requires a certain level of skill, as professionals aim to create a document that both communicates the intended message clearly and is visually appealing to the intended audience. Creators may iteratively adjust and modify templates, tuning each element of the design—from the choice of images, the layout, the color scheme, to the style of text—to better match the purpose of the document.

SUMMARY

Systems and methods for generating completed design documents based on text prompts are described. Embodiments of the present disclosure include a design generation apparatus configured to match an intent of a user to a plurality of design templates. A user's intent is represented by one or more prompts obtained from the user, as well as any edits the user makes to the design templates. For example, the prompts from the user may be encoded to form an intent embedding, and content generated based on the prompts may also be encoded and included in the embedding. The system retrieves a plurality of design templates based on the intent embedding. The user may customize a template using an additional prompt to, e.g., replace or generate new content within the template. An image generation model is configured to generate image content for use in the design document, and a text field recommender is configured to generate textual content for text fields in the design document. In this way, embodiments allow users to generate and customize design documents using text prompts.

A method, apparatus, non-transitory computer readable medium, and system for generating design documents from text are described. One or more aspects of the method, apparatus, non-transitory computer readable medium, and system include obtaining a design prompt; retrieving a plurality of document templates based on the design prompt; obtaining an image prompt; filtering the plurality of document templates based on the image prompt; selecting a document template based on the filtering; and generating a document based on the document template and the image prompt.

An apparatus, system, and method for generating design documents from text are described. One or more aspects of the apparatus, system, and method include obtaining a design prompt; retrieving a plurality of document templates based on the design prompt; obtaining an image prompt; filtering the plurality of document templates based on the image prompt; selecting a document template based on the filtering; and generating a document based on the document template and the image prompt.

An apparatus, system, and method for generating design documents from text are described. One or more aspects of the apparatus, system, and method include at least one processor; at least one memory including instructions executable by the at least one processor; a template database storing a plurality of document templates; an intent component configured to encode a design prompt to obtain a design prompt embedding; a filtering component configured to filter the plurality of document templates based on an image prompt; and a document generation component configured to generate a document based on an image prompt and a selected document template of the plurality of document templates.

DETAILED DESCRIPTION

Figure 1:
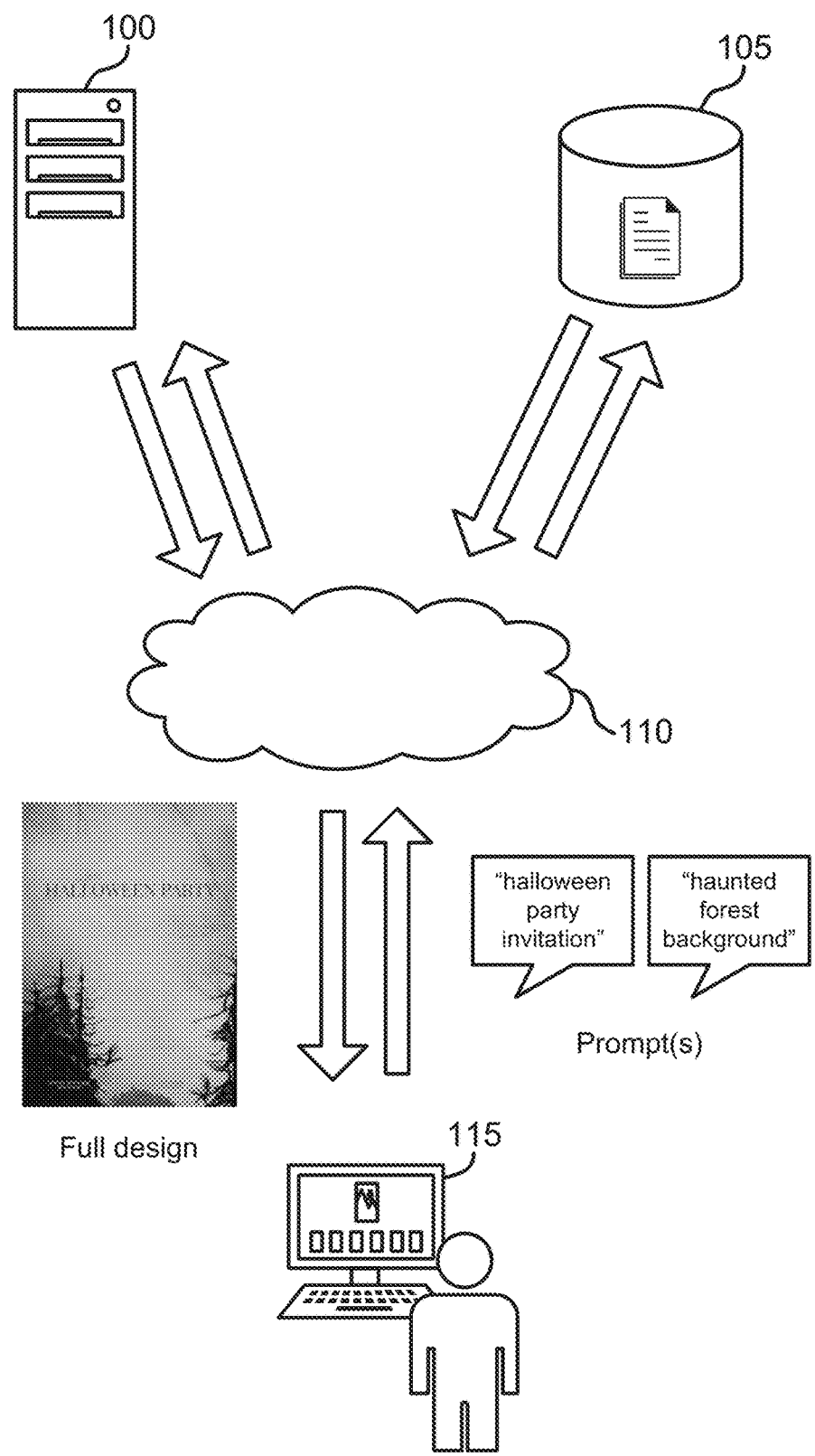
FIG. 1 shows an example of a design generation system according to aspects of the present disclosure.

A design document serves as a visual and textual medium, elegantly blending various elements to convey information, messages, or invitations to a specific audience. These documents often incorporate a range of components, such as images, icons, colors, fonts, and text, arranged thoughtfully on a canvas to achieve a harmonious aesthetic appeal. The versatility of design documents allows them to be used across diverse contexts. They can take the form of informational pamphlets, providing crucial details on a range of topics, flyers announcing events or promoting products and services, or invitations, adding a personal touch to events such as weddings or corporate gatherings.

In some cases, users select from existing templates to save time and resources in generating specific, defined-dimensions designs for different platforms, such as for online social media platforms. A creative workflow for making a design document can involve iteratively adjusting and modifying a design template and tuning each element of the design—from the choice of images, the layout, the color scheme, to the style of text—to better match the purpose of the document.

Conventional methods for design generation are based on search. In some examples, a user provides a query through an input field, and a system provides a set of results that closely match the given query. The user scrolls through the results and selects one of the images for editing as a starting point. If after a series of edits the result is unsatisfactory, the user must begin the process from scratch. For example, when text lengths are changed, a user's initial design may no longer fit or make sense with the text fields in the template, breaking the design.

The iterative editing process can also take an extensive amount of time, especially when it involves the manual creation of assets. Further, it is not uncommon for the finalized design document, even after numerous modifications, to not fully embody the creator's initial intent due to the constraints of the template used.

The present disclosure describes embodiments configured to generate full designs from text. Embodiments include an intent component configured to encode user prompts to generate an intent embedding as a representation of the user's intent. The intent component retrieves a plurality of design templates based on an intent embedding from an initial design prompt. The user may also provide an image prompt, such as a description of an image. An image generation model may generate one or more images based on the description, and the one or more images may be applied to the plurality of design templates. A filtering component re-orders the plurality of design templates, providing templates that are semantically coherent with the user's custom content, as well as templates that are compatible with the user's texts.

Accordingly, embodiments are configured to improve on document creation by enabling a user to input a text prompt, providing semantically relevant design templates based on the text prompt, generating image and text assets that are compatible with the design templates, and automatically integrating the assets. According to some aspects, the system also harmonizes the generated image and text aspects with the canvas of the design template by optimizing the placement of the texts and the images, and by ensuring the texts have sufficient contrast with the background beneath them.

A design generation system is described with reference to FIGS. 1-5. Methods for generating designs from text are described with reference to FIGS. 6-7. A computing device configured to implement a design generation apparatus is described with reference to FIG. 8.

Design Generation System

An apparatus for generating design documents from text is described. One or more aspects of the apparatus include at least one processor; at least one memory including instructions executable by the at least one processor; a template database storing a plurality of document templates; an intent component configured to encode a design prompt to obtain a design prompt embedding; a filtering component configured to filter the plurality of document templates based on an image prompt; and a document generation component configured to generate a document based on an image prompt and a selected document template of the plurality of document templates.

Some examples of the apparatus, system, and method further include texting field recommender configured to generate a recommended text field based on the design prompt. Some examples further include an image generation model configured to generate an image based on the image prompt.

FIG. 1 shows an example of a design generation system according to aspects of the present disclosure. The example shown includes design generation apparatus 100, template database 105, network 110, and user interface 115.

FIG. 1 illustrates a schematic overview of a design generation system. In an example, a user provides a prompt via user interface 115. The prompt may describe an intent for a design, e.g., "Halloween party invitation". Design generation apparatus 100 then retrieves an initial set of design templates from template database 105 based on the prompt. A user provides an additional prompt, such as a prompt describing an image, e.g., "haunted forest". Design generation apparatus 100 then generates content based on this additional prompt, and updates the design templates to include the user curated content. In some cases, the user further edits the text fields of a selected design template, and design generation apparatus 100 updates the fields of the remaining design templates using text content that is generated based on the user edits. The user may then select any of the designs as the full design.

In some embodiments, one or more components of design generation apparatus 100 are implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a super computer, or any other suitable processing apparatus.

According to some aspects, design generation apparatus 100 obtains a design prompt. In some examples, design generation apparatus 100 obtains an image prompt. In some examples, design generation apparatus 100 receives a text input for the document, where the document is based on the text input. In some aspects, the image prompt includes an image, and where the document includes the image. In some aspects, the image prompt includes a description of an image. Design generation apparatus 100 is an example of, or includes aspects of, the corresponding element described with reference to FIG. 2.

Template database 105 is configured to store a plurality of design templates, as well as other data used by design generation apparatus 100 such as images, model parameters, and the like. A database is an organized collection of data. For example, a database stores data in a specified format known as a schema. A database may be structured as a single database, a distributed database, multiple distributed databases, or an emergency backup database. In some cases, a database controller may manage data storage and processing in a database. In some cases, a user interacts with a database controller. In other cases, a database controller may operate automatically without user interaction. Template database 105 is an example of, or includes aspects of, the corresponding element described with reference to FIG. 3.

Network 110 facilitates the transfer of information between design generation apparatus 100, template database 105, and a user. In some cases, network 110 is referred to as a "cloud". A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

According to some aspects, user interface 115 includes hardware and software configured to display information generated by design generation apparatus 100 and to receive input from a user. For example, user interface 115 may include a display panel, a keyboard and mouse, a graphical user interface (GUI), and the like.

According to some aspects, user interface 115 displays a set of document templates generated or retrieved by design generation apparatus 100. In some examples, user interface 115 receives a selection input, where a document template is selected based on the selection input. User interface 115 is an example of, or includes aspects of, the corresponding element described with reference to FIG. 2.

Figure 2:
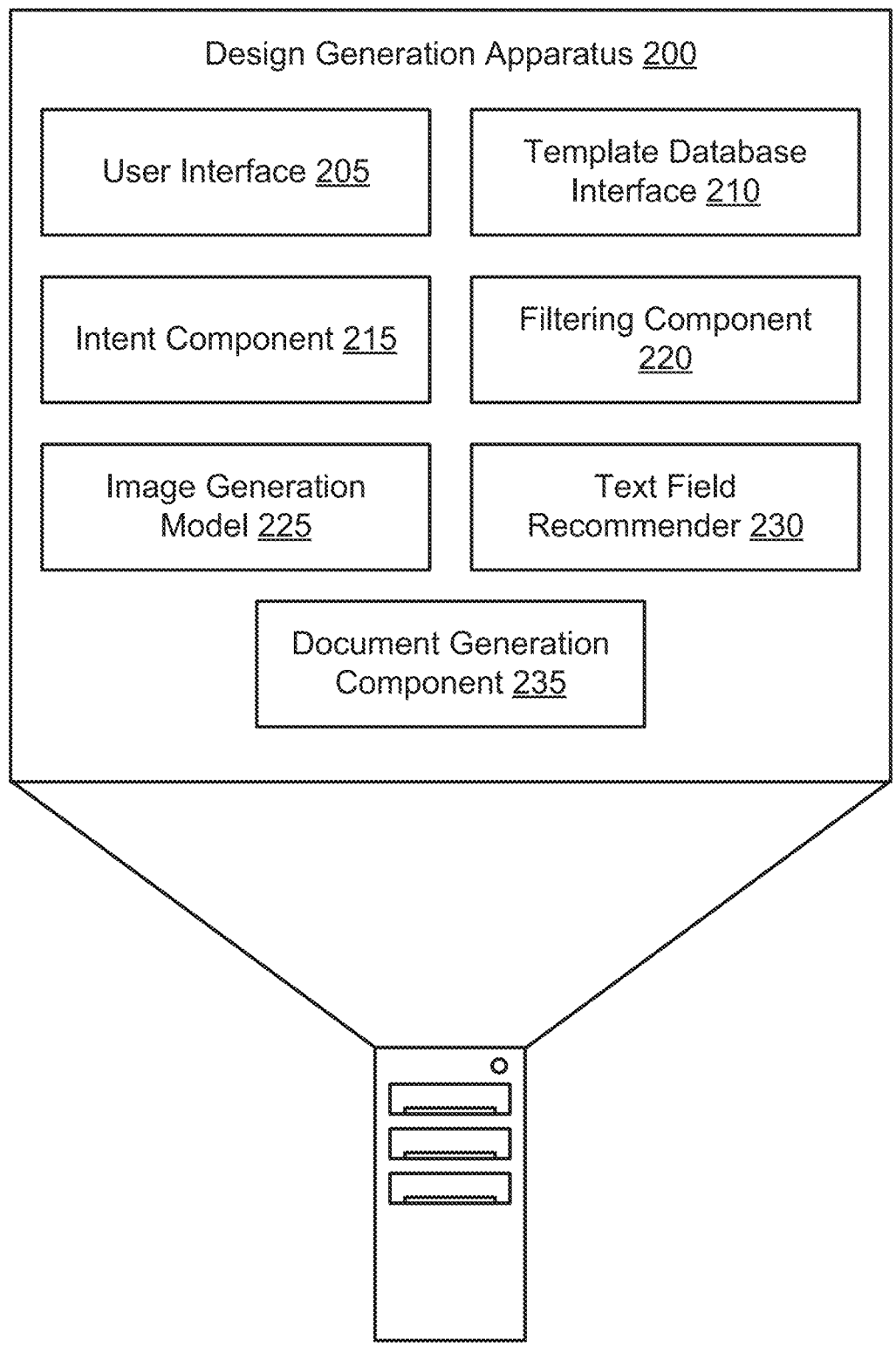
FIG. 2 shows an example of a design generation apparatus according to aspects of the present disclosure.

FIG. 2 shows an example of a design generation apparatus 200 according to aspects of the present disclosure. The example shown includes design generation apparatus 200, user interface 205, template database interface 210, intent component 215, filtering component 220, image generation model 225, text field recommender 230, and document generation component 235. Design generation apparatus 200 is an example of, or includes aspects of, the corresponding element described with reference to FIG. 1. User interface 205 is an example of, or includes aspects of, the corresponding element described with reference to FIG. 1. For example, user interface 205 may provide similar functionality across embodiments, but may be implemented variously according to embodiments. In some cases, for example, some components of design generation apparatus 200 are implemented on a server while other components such as user interface 205 are implemented on a user device.

Embodiments of design generation apparatus 200 include several components and sub-components. These components are variously named and are described so as to partition the functionality enabled by the processor(s) and the executable instructions included in the computing device used in design generation apparatus 200 (such as the computing device described with reference to FIG. 8). In some examples, the partitions are implemented physically, such as through the use of separate circuits or processors for each component. In some examples, the partitions are implemented logically via the architecture of the code executable by the processors.

Template database interface 210 is configured to interface with an external template database, such as the one described with reference to FIG. 1. In some embodiments, design templates may be stored on an external template database, on a memory of design generation apparatus 200, or a combination thereof.

Intent component 215 is configured to generate a representation of a user's intent. In some examples, intent component 215 generates a vector representation (i.e., an embedding) of prompts obtained from a user, or of content curated by the user. Intent component 215 then compares this intent embedding with design template embeddings in a template database. According to some aspects, intent component 215 processes design templates in the template database in a preprocessing phase to generate the design template embeddings for use during design generation.

According to some aspects, intent component 215 retrieves a set of document templates based on a design prompt. In some examples, intent component 215 compares the design prompt embedding to a template embedding for each of a set of retrieved document templates, respectively. In some examples, intent component 215 encodes an image prompt to obtain an image prompt embedding. In some examples, intent component 215 compares the image prompt embedding to a template embedding for each of the set of document templates, respectively. In some examples, intent component 215 encodes a description of a template to obtain a description embedding. In some examples, intent component 215 encodes a caption of a visual element of the template to obtain a caption embedding. In some examples, intent component 215 combines the description embedding and the caption embedding to obtain the template embedding. The template embeddings may be generated in this way in a preprocessing phase, for example. Intent component 215 is an example of, or includes aspects of, the corresponding element described with reference to FIG. 3.

Filtering component 220 filters the set of document templates retrieved by intent component 215 based on additional criteria. In some embodiments, filtering component 220 filters the set of retrieved document templates according to each document template's number of images, or number of textual elements. Some embodiments of filtering component 220 filter the set of retrieved document templates according to each document template's "document type", such as "banner", "poster", "pamphlet", "social media post", or the like. For example, intent component 215 may include a classifier configured to process a user's prompt to determine an intended document type, and this classification may be applied to filtering component 220.

In some embodiments, filtering component 220 filters a set of document templates to include document templates including a number of textual elements within a certain range. For example, let $t_m$ be the number of texts the user has provided for a template, and $t_o$ be the number of optional texts (e.g., a remaining number of texts not yet provided by the user, or optional text fields in the template). A first filtering step is to limit the number of texts in the target templates. Filtering component 220 filters templates with a number of texts that are outside the interval $[t_m, t_m+t_o+t_e]$, where $t_e$ is a constant integer, of the number of allowed extra texts. In some cases, the constant value is a low value because eliminating a high number of texts can lead to an unbalanced design.

In some embodiments, filtering component 220 performs a second text filtering step related to text lengths. The design generation apparatus matches the texts between a user's input text and a text field from a document template. The texts are matched by length using bipartite graph matching. In some cases, if a match violates the length compatibility constraint, i.e., abs(l1,l1)≤max (α,β*min (l1,l2)), where l1 and l2 are the length of the texts in the pair, the target template is filtered. In some examples, a is a threshold that specifies the compatibility margin for small texts. For example, adding four characters to a text of three characters is not a significant increase even though the increase includes a factor of 2. In another example, adding 10 characters to a text of 20 characters is considered significant (and hence undesirable). β is used for large texts. In some cases, if no text is provided, the second text filtering step is skipped.

In some embodiments, filtering component 220 additionally filters documents based on their images. Different document templates contain different images. Some of the images contain an alpha channel, and these images may be referred to as assets. Images that do not contain an alpha channel may be referred to as content images. In some cases, when starting a design, users start from a content image. Accordingly, in some embodiments, filtering component 220 filters based on the number of content images. Content images may include foreground images and background images (e.g., patterns, textures, overlays, etc.). For example, foreground images may include image content of foreground objects and subjects. In some cases, filtering component 220 includes a vision transformer (ViT) based classifier configured to classify images in a document template as foreground images or as background images, and then filter the templates based on the foreground images or the number of foreground images. In some embodiments, document templates that have a different number of foreground images than the images provided by the user (e.g., uploaded images or images generated from a description) are eliminated. In some cases, when no image prompt is provided, this filtering step is skipped.

According to some aspects, filtering component 220 filters the set of document templates based on an image prompt. In some examples, filtering component 220 selects a document template based on the filtering. In some examples, filtering component 220 sorts the set of document templates based on a text input. For example, filtering component 220 may filter or sort the set of retrieved document templates based on a user's edits to the text fields of a selected document template. In some examples, filtering component 220 determines the length(s) of the user's text edits, and filters the document templates therefrom. Filtering component 220 is an example of, or includes aspects of, the corresponding element described with reference to FIG. 3.

Image generation model 225 is configured to generate images based on a user's description. For example, an "image prompt" from a user may include user uploaded image, or a user's description of a desired image. Image generation model 225 may include a generative model such as a denoising diffusion probabilistic model (DDPM) that is configured to generate an image using a condition, such as a text prompt, as a basis. Image generation model 225 may include other generative models, such as Generative Adversarial Networks (GANs), Variational Autoencoders (VAEs), transformer-language models like DALL-E, and others. According to some aspects, image generation model 225 generates an image based on the image prompt, where the design document includes the generated image. In at least one embodiment, the intent component 215 processes the generated image to update a user's intent embedding. In some cases, the image generation is further conditioned by the properties of one or more document templates to ensure that the generated image harmonizes with the text fields of the document templates. For example, image generation model 225 may generate images that contrast with a text color of the text fields in areas corresponding to the text fields. Image generation model 225 is an example of, or includes aspects of, the corresponding element described with reference to FIG. 3.

Text field recommender 230 is configured to generate text suggestions within text fields of document templates, based on the user's prompts or on the user's edits to the text fields. Embodiments of text field recommender 230 include a language model (LM) configured to recommend texts for each text field within a design template. In some cases, text field recommender 230 further includes a semantic category appended to the recommendation, e.g., in parentheses, to further guide the user. For example, text field recommendations for templates retrieved according to a "pet adoption" design prompt may include: "Pet Adoption Center (Title)", "555-123456 (phone contact)", "www. [website].com (website contact)." When a user edits these text field recommendations, the text fields of a remaining set of document templates may be updated by text field recommender 230 as well.

According to some aspects, text field recommender 230 generates a recommended text field based on the design prompt, where the text input corresponds to the recommended text field. In some examples, text field recommender 230 computes a location for the text input based on the text input and the document template, where the document includes the text input at the location. Text field recommender 230 is an example of, or includes aspects of, the corresponding element described with reference to FIG. 3.

Document generation component 235 is configured to combine the assets generated by image generation model 225 and text field recommender 230 with the set of retrieved and filtered document templates to produce one or more generated documents. According to some aspects, document generation component 235 is further configured to save a portion or all of the final generated design document as a template in the template database for later use.

Figure 3:
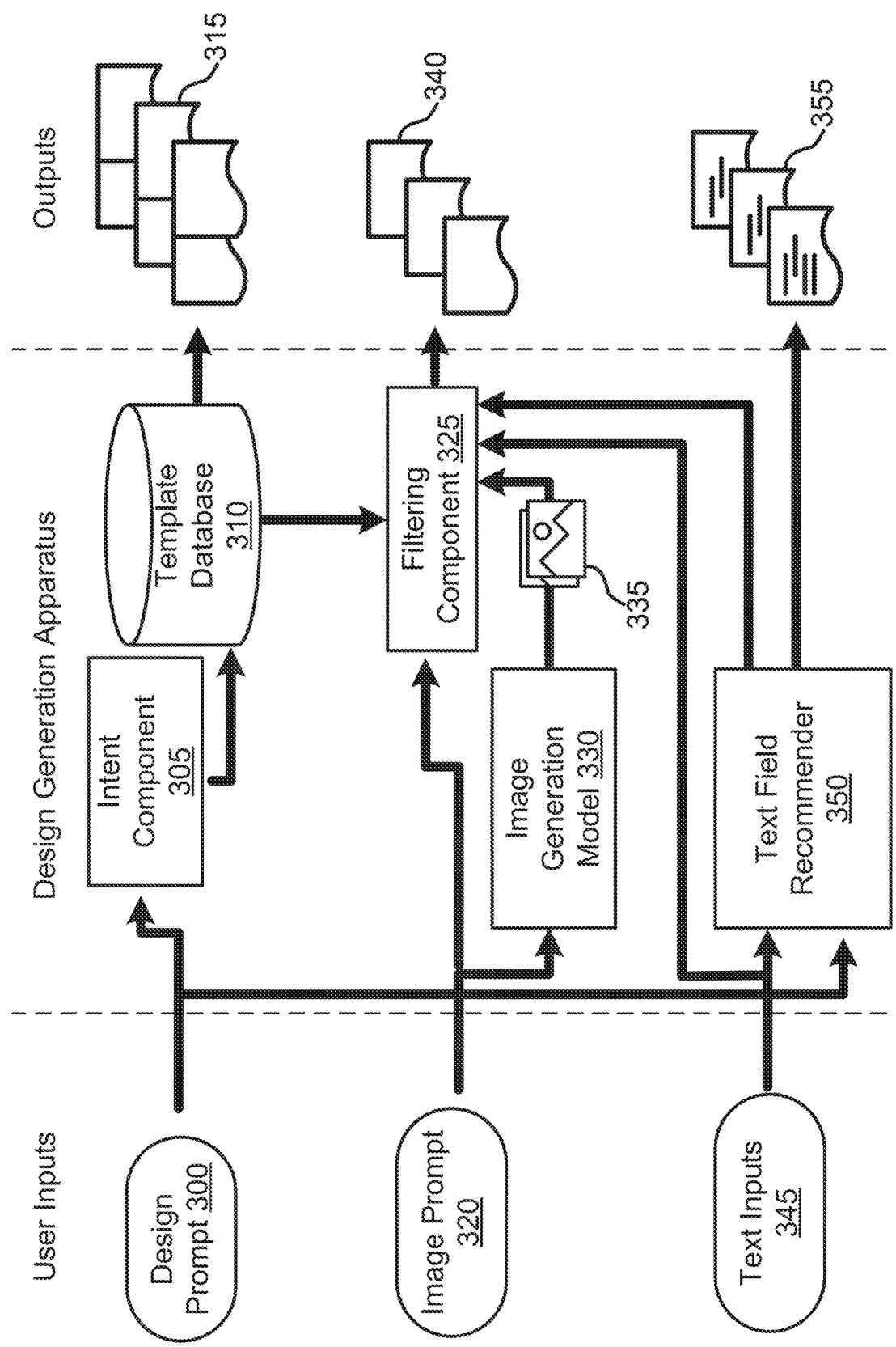
FIG. 3 shows an example of a pipeline for document generation according to aspects of the present disclosure.

FIG. 3 shows an example of a pipeline for document generation according to aspects of the present disclosure. The example shown includes design prompt 300, intent component 305, template database 310, document templates 315, image prompt 320, filtering component 325, image generation model 330, generated images 335, filtered document templates 340, text inputs 345, text field recommender 350, and updated documents 355.

Template database 310 is an example of, or includes aspects of, the corresponding element described with reference to FIG. 1. Intent component 305, filtering component 325, image generation model 330, and field recommender 350 are examples of, or includes aspects of, the corresponding elements described with reference to FIG. 2.

In the example shown, a user inputs a design prompt 300 via a user interface. For example, a GUI may ask the user which type of design they wish to create, and the user may provide a prompt that indicates an intent for their design, such as "adoption event flyer" or "wedding invitation by the beach". Meanwhile, a design generation apparatus, such as the one described with reference to FIGS. 1-2, processes the design prompt 300. For example, intent component 305 encodes the prompt with a trained transformer model to generate a vector semantic representation, referred to as an intent embedding.

Embodiments of intent component 305 include an encoder based on a sentence-BERT model (e.g., mpnetv2, sentence-t5) to generate the intent embeddings. Intent component 305 compares the intent embedding to design template embeddings stored in template database 310. In some embodiments, intent component 305 computes a cosine similarity with the template embeddings, and returns a top-N number of embeddings based on the comparison, and document templates 315 are retrieved from their corresponding embeddings. In some cases, the template embeddings represent a multimodal annotation. For example, the template embeddings may represent both an embedding of a description of the document template, as well as embedding(s) of visual captions of the visual elements in the document template. According to some aspects, a captioning model such as BLIP is used to generate visual captions for the templates in a preprocessing phase, and the visual captions are then encoded along with the template description to form the template embedding in the preprocessing phase.

After intent component 305 returns a set of document templates 315, a user can either select one of the document templates for editing, or provide an additional image prompt 320. The image prompt 320 allows the user to curate visual content for the final design. The image prompt 320 may be an uploaded image, or a short description of an image, such as "wedding rings on a seashell lying on the beach".

When the image prompt 320 is a short description, image generation model 330 uses the prompt to conditionally generate one or more images, such as generated images 335. According to some aspects, image generation model 330 further uses the images in the document templates as condition for generation, so that the new image content aligns with the saliency of the previous image content. In some embodiments, image generation model 330 is conditioned on the position and colors of the input texts in each document template to produce a resulting image that is contrastive to the texts to increase the readability of the texts. For example, some embodiments of image generation model 330 extract the colors for each text T in a design D, and then provide the colors and the positions of T to image generation model 330 to ensure contrasting colors are generated at the positions.

In some embodiments, image generation model 330 adds noise by combining the image from the document template with noise (e.g., Gaussian, Uniform or Fractal) according to an intensity parameter $\alpha$, then blurring the result with a Gaussian kernel. In some cases, the model can control the amount of detail from the original image using a parameter $\beta$ which ensures that the generated image is similar to the original and includes appropriate content.

In some embodiments, image generation model 330 performs a saliency detection algorithm that compares the saliency of an input image (e.g., an original image of a document template) with a target image (e.g., the generated image). The algorithm then determines a crop of the target image that maximizes the saliency between two images.

According to some embodiments, image generation model 330 further extracts a color palette of three colors from the input image and selects the closest N results from a database of color palettes, or generates a new color palette similar to the extracted color palette. The image generation model 330 then computes the distance between an extracted three-color palette and retrieved m-color palette using bipartite graph matching, with costs represented by a color distance metric. For example, the color distance metric may be a CIELab distance. The distance between two palettes is the sum of distances between the best matching colors. Finally, image generation model 330 applies the new palette to the template such that it matches the user curated image.

After image generation model 330 generates generated images 335, or the user has provided their own image, filtering component 325 refreshes document templates 315 to remove irrelevant templates and to include the user curated image. For example, filtering component 325 may filter the set of document templates or retrieve new templates based on the templates' saliency to the user curated content.

As described with reference to FIG. 2, a filtering component may filter based on a number of foreground images in each document template by comparing the number to the number of generated images 335. For example, the number of generated images 335 may correspond to a number of image prompts 320 provided by the user, and filtering component 325 may filter the set of document templates to keep only document templates with a number of foreground images that matches this number. The new set of document templates is referred to as filtered document templates 340.

In some embodiments, filtering component 325 further performs a K-matching algorithm based on the intent embedding, where the top-K document templates are selected as filtered document templates 340 based on their similarity to the intent embedding. For example, some embodiments of filtering component 325 compute a similarity between embeddings of the user curated images and the template images, as well as a similarity between an embedding of the image prompt and the embeddings of the template images. In some examples, the embeddings are generated in a multi-modal space, such as a CLIP-like space. The multi-modal space may, for example, include embeddings that correspond to either textual input data or visual input data.

In some cases, a user also provides text inputs 345. For example, a user may select one of the filtered document templates 340 as a selected document template and edit the text fields thereof. Filtering component 325 may perform additional filtering based on text inputs 345. For example, filtering component 325 may additionally filter filtered document templates 340 based on the number and lengths of text inputs 345.

In some examples, filtering component 325 uses a mix of costs to compute text pair distances, where a pair of texts includes a text provided by a user and a text within a target template. A cost between a pair may be expressed as $C_{ss} - \alpha_1 * C_{title} + \alpha_2 * C_{length} + \alpha_3 * C_{opt} + \alpha_4 * C_e$. The base cost, $C_{ss}$, is given by the semantic meaning of the texts which is computed by a semantic similarity model. In some embodiments, the remaining costs $C_i$ are optional. For example, $\alpha_1$ is 1 when the pair of texts represents titles and $C_{title}$ is a cost value that satisfies $C_{title} > C_{ss}, C_{opt}, C_e$. In some examples, a minus (i.e., subtraction) is used to boost the changes of the two titles to match regardless of, e.g., a relatively worse semantics similarity. In some cases, $\alpha_2$ is 1 when the length compatibility function is false and $C_{length}$ is higher than other costs to prevent improper length matches which would lead to bad end results. In some embodiments, $\alpha_3$ is 1 when the current input text represents an optional text and $C_{opt} > C_{ss}$ to prioritize the required texts. In some cases, $\alpha_4$ is 1 when the target text represents an extra text and $C_e > C_{ss}$ to prioritize the non-extra texts of the template.

Text inputs 345 are further applied to text field recommender 350. As described with reference to FIG. 2, text field recommender 350 is configured to update the texts of filtered document templates 340 based on user inputs to the text fields of a selected document, e.g., text inputs 345. In some cases, text field recommender 350 recommends texts without the text inputs 345. For example, text field recommender 350 may suggest values for text fields based on design prompt 300. The recommendations may include a value, such as a title suggestion "Pet Adoption Center", as well as a suggested semantic category, such as "(Title)" appended to the value.

Embodiments of text field recommender 350 include a language model (LM) configured to generate text suggestions based on the intent embedding (which is in turn based on design prompt 300) as well as the default text fields in the document templates. According to some aspects, the LM is trained in a training phase using reinforcement learning (RL) to generate suggestions that align with user prompts. The user prompt training data may be generated by another language model, such as a large language model (LLM), e.g. OpenAI's daVinci. Embodiments of text field recommender 350 include a flan-t5-xl encoder-decoder model, though other architectures may be used.

Some embodiments of text field recommender 350 further include a Boolean classifier that determines whether or not text field suggestions should be generated. For example, document designs related to a résumé or food menu may cause a model without the classifier to generate too many fields for a user to edit. Embodiments of the classifier may further prevent the text field recommender 350 from generating unrelated, unethical, biased, or sexual content. The outputs of text field recommender 350 are combined with the content from filtered document templates 340 to produce updated documents 355.

Accordingly, the design generation apparatus provides a set of one or more full document designs based on user input texts. The apparatus further enables wider customization of available document templates. In this way, embodiments enable a faster design creation process for users, as well as enables users to create designs that include their intended content and aesthetic without compromising due to constraints of the design templates.

Figure 4:
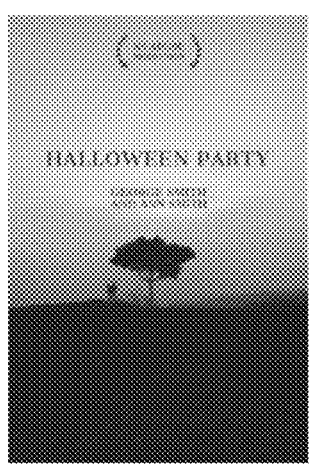
FIG. 4 shows an example of design templates with different customization according to aspects of the present disclosure.
Figure 4:
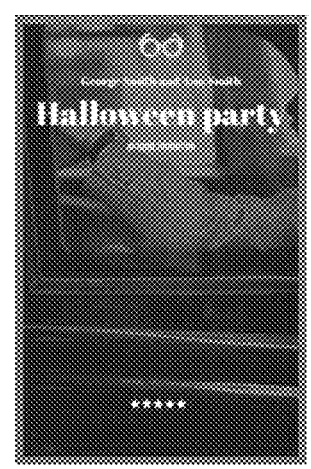
Figure 4:
Figure 4:
Figure 4:
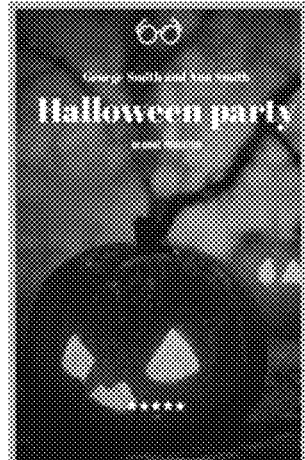
Figure 4:
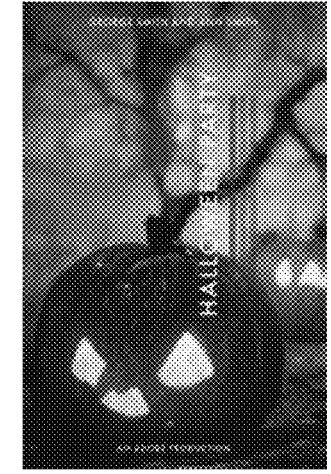

FIG. 4 shows an example of design templates with different customization according to aspects of the present disclosure. The example shown includes "design templates based on design prompt only" 400, "design templates including a generated image" 405, and "design templates including user provided image" 410.

With reference to FIG. 3, a user may input a design prompt and retrieve a set of initial design templates. Examples of templates retrieved by the design generation apparatus based on the prompt only are shown as "design templates based on design prompt only" 400. The templates shown in FIG. 4 correspond to a prompt similar to "Halloween party invitation." If a user provides a description of an image, then the set of templates may be updated to show "design templates including a generated image" 405. For example, the background images behind the words "Halloween Party" as shown in the Figure may be generated by an image generation model as described with reference to FIGS. 2-3. When a user uploads an image, then the set of templates may be updated to show "design templates including user provided image" 410. In this example, the user has uploaded an image including a jack-o-lantern in the foreground and a blurred tree in the background.

Figure 5:
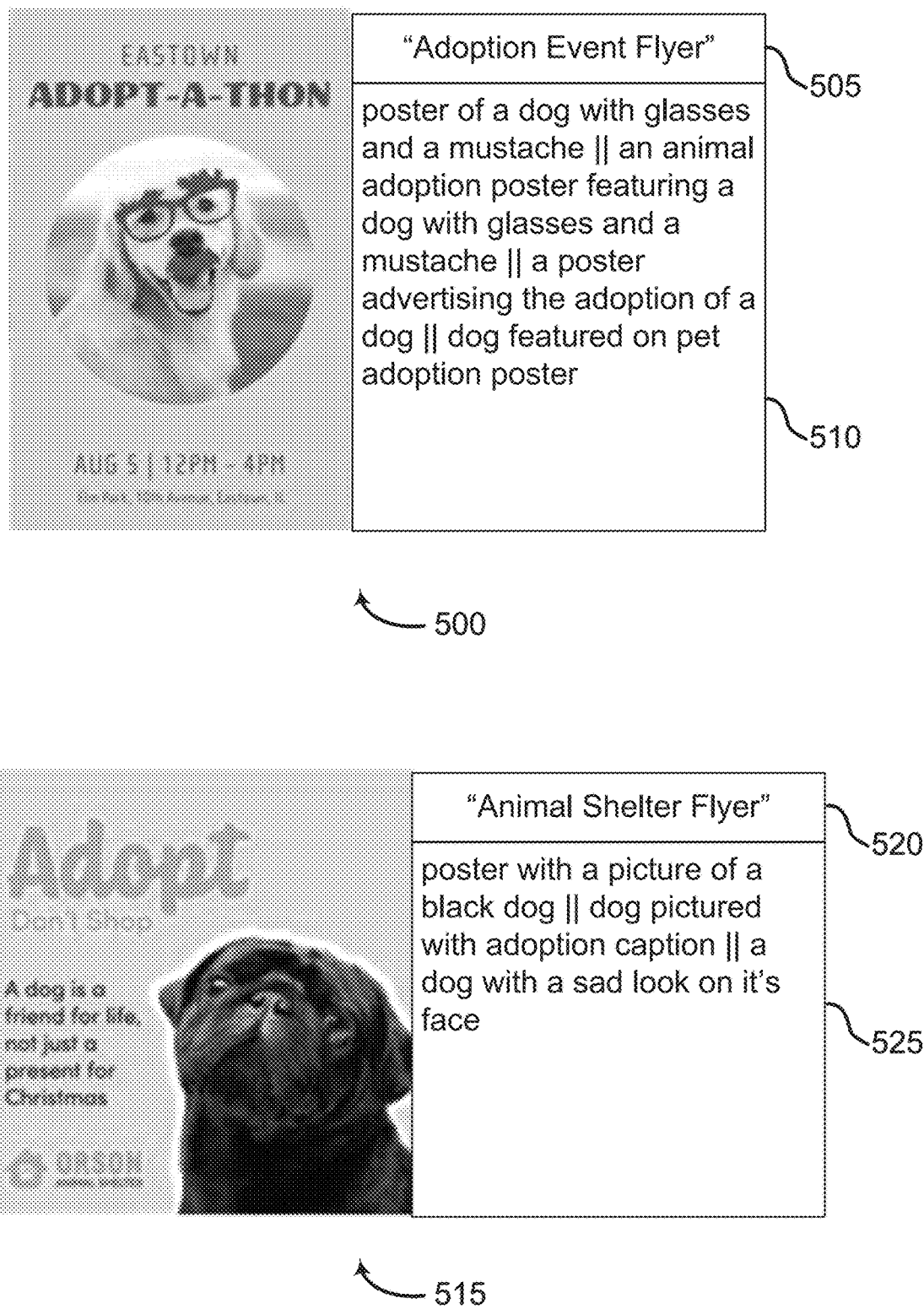
FIG. 5 shows an example of design templates including template description and visual captions according to aspects of the present disclosure.

FIG. 5 shows an example of document templates including template descriptions and visual captions according to aspects of the present disclosure. The example shown includes first document template 500 and second document template 515.

In some examples, a document template includes a template description and one or more visual captions. In some cases, the template description corresponds to a "title" of the document template and is set by a creator before the document template is entered into a database. The visual captions may be generated by a separate captioning model. For example, the visual captions may be generated by a Bootstrapping Language-Image Pre-training (BLIP) model, though other vision-language models may be used. In some embodiments, each document template includes 4 visual captions, though the present disclosure is not limited thereto. The visual captions may be generated by the captioning model and then encoded into visual caption embeddings. The template description may also be encoded to generate a template description embedding. According to some aspects, the visual caption embeddings and the template description embedding are combined to form a document template embedding.

In the example shown, first document template 500 illustrates an adoption event flyer design that includes a visual element of a dog wearing glasses. With reference to FIG. 2, this visual element may correspond to a "foreground image" that is counted by a filtering component to ensure document template compatibility with a user's intent. The first document template 500 may further include a first template description 505 "adoption event flyer" that describes the design, as well as first visual captions 510. It should be noted that first visual captions 510 capture visual information that is not included in the first template description 505. For example, first visual captions 510 indicate that the design includes a picture of "dog with glasses and a mustache", so that if a user includes this information in their prompt, the system may reliably retrieve this template. Second document template 515 similarly includes second template description 520 and second visual captions 525.

Design Generation

A method for generating design documents from text is described. One or more aspects of the method include obtaining a design prompt; retrieving a plurality of document templates based on the design prompt; obtaining an image prompt; filtering the plurality of document templates based on the image prompt; selecting a document template based on the filtering; and generating a document based on the document template and the image prompt.

Some examples of the method, apparatus, non-transitory computer readable medium, and system further include encoding the design prompt to obtain a design prompt embedding. Some examples further include comparing the design prompt embedding to a template embedding for each of the plurality of document templates, respectively. Some examples further include encoding the image prompt to obtain an image prompt embedding. Some examples further include comparing the image prompt embedding to a template embedding for each of the plurality of document templates, respectively.

Some examples of the method, apparatus, non-transitory computer readable medium, and system further include encoding a description of a template to obtain a description embedding. Some examples further include encoding a caption of a visual element of the template to obtain a caption embedding. The caption may correspond to visual content within the template. Some examples further include combining the description embedding and the caption embedding to obtain the template embedding.

Some examples of the method, apparatus, non-transitory computer readable medium, and system further include receiving a text input, wherein the document is based on the text input. The text input may be an addition or edit to one of the text fields of one of the plurality of document templates. Some examples of the method, apparatus, non-transitory computer readable medium, and system further include generating a recommended text field based on the design prompt, wherein the text input corresponds to the recommended text field. The recommended text field may include a recommended text and a suggested semantic category. In some examples, the suggested semantic category is parenthesized and appended to the recommended text. Some examples of the method, apparatus, non-transitory computer readable medium, and system further include sorting the plurality of document templates based on the text input.

Some examples of the method, apparatus, non-transitory computer readable medium, and system further include computing a location for the text input based on the text input and the document template, wherein the document includes the text input at the location. Some examples further include displaying the plurality of document templates. For example, the system may display the plurality of document templates through a user interface. The system may display, e.g., a selected document template among the plurality of the document templates in a main window, and display a remainder of the plurality of document templates in a side window. Some examples further include receiving a selection input, wherein the document template is selected based on the selection input.

In some aspects, the image prompt comprises an image, and wherein the document comprises the image. In some aspects, the image prompt comprises a description of an image. Some examples of the method, apparatus, non-transitory computer readable medium, and system further include generating an image based on the image prompt, wherein the document includes the generated image. In some cases, the method further comprises encoding either the provided image or the generated image to generate an image embedding, and filters the plurality of retrieved documents based on the image embedding.

Figure 6:
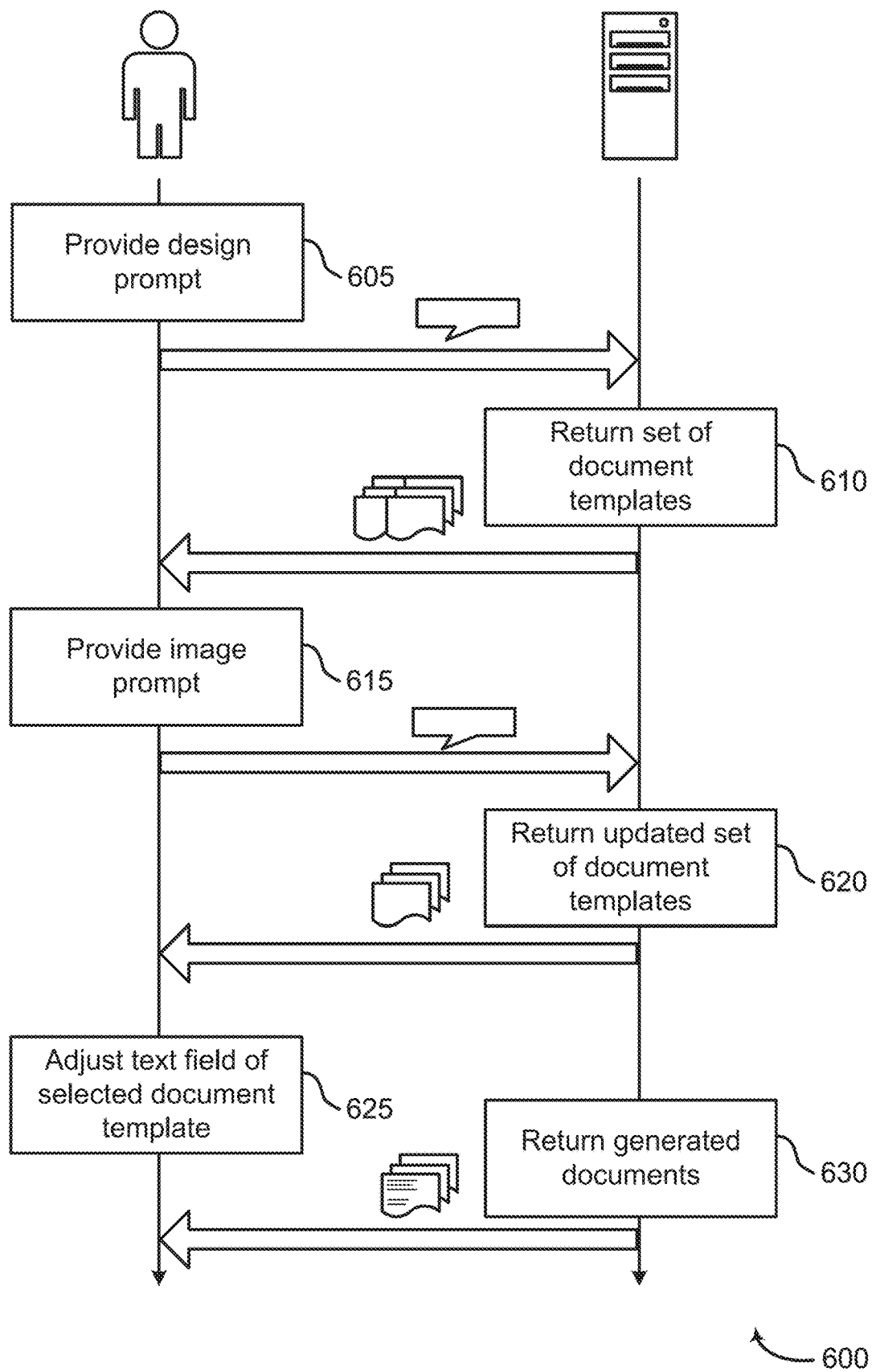
FIG. 6 shows an example of a method for providing generated designs to a user according to aspects of the present disclosure.

FIG. 6 shows an example of a method 600 for providing generated designs to a user according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, a user provides a design prompt. The design prompt may indicate an intent for the desired design. For example, the design prompt may include a type of design the user wishes to generate as well as the style of the document, such as a "Halloween-themed invitation" or a "wedding invitation including rings sitting in sand on a beach".

At operation 610, the system returns a set of document templates. In some examples, an intent component of the system encodes the design prompt to generate an intent embedding, where the document templates are retrieved based on the intent embedding. Additional detail regarding the intent component and document template retrieval is provided with reference to FIGS. 2-3.

At operation 615, the user provides an image prompt. The image prompt may be a user provided image, or may be a description of an image the user wishes to generate. In the latter case, an image generation model of the system may generate the image as described with reference to FIGS. 2-3. The image generation model may be any generative model that is configured to condition its generation based on a prompt, such as a textual description of the image. For example, embodiments of the image generation model include a diffusion model.

At operation 620, the system returns an updated set of document templates. This step may be performed by a filtering component according to a process as described with reference to FIGS. 2-3. The system may compare the saliency of the user curated content from the image prompt with the content in the document templates, and filter the documents based on this saliency. The comparison may be made by, for example, comparing the embeddings of the user curated content or the image prompt with embeddings of the document templates. According to some aspects, the system further updates the set of document templates to include the user curated content (e.g., the provided image or the generated image). The system may add the user curated content in a way that ensures compatibility with the colors and the text fields of the document templates. Additional detail regarding ensuring compatibility is provided with reference to FIGS. 2-3.

At operation 625, the user adjusts a text field of selected document template. For example, the user may adjust a default text field of the selected document template or adjust a recommended text value provided by the system. The adjustments may be additionally encoded and incorporated into the intent embedding, or may be processed by a text field recommender component as described with reference to FIGS. 2-3. The text field recommender component may update the remaining fields of the selected document template based on the users edits to a single field. According to some aspects, the text field recommender component updates the fields of the remaining document templates as well.

At operation 630, the system returns the generated documents. For example, the system may provide a set of documents based on the previous set of document templates which have been updated to include the user curated content.

Figure 7:
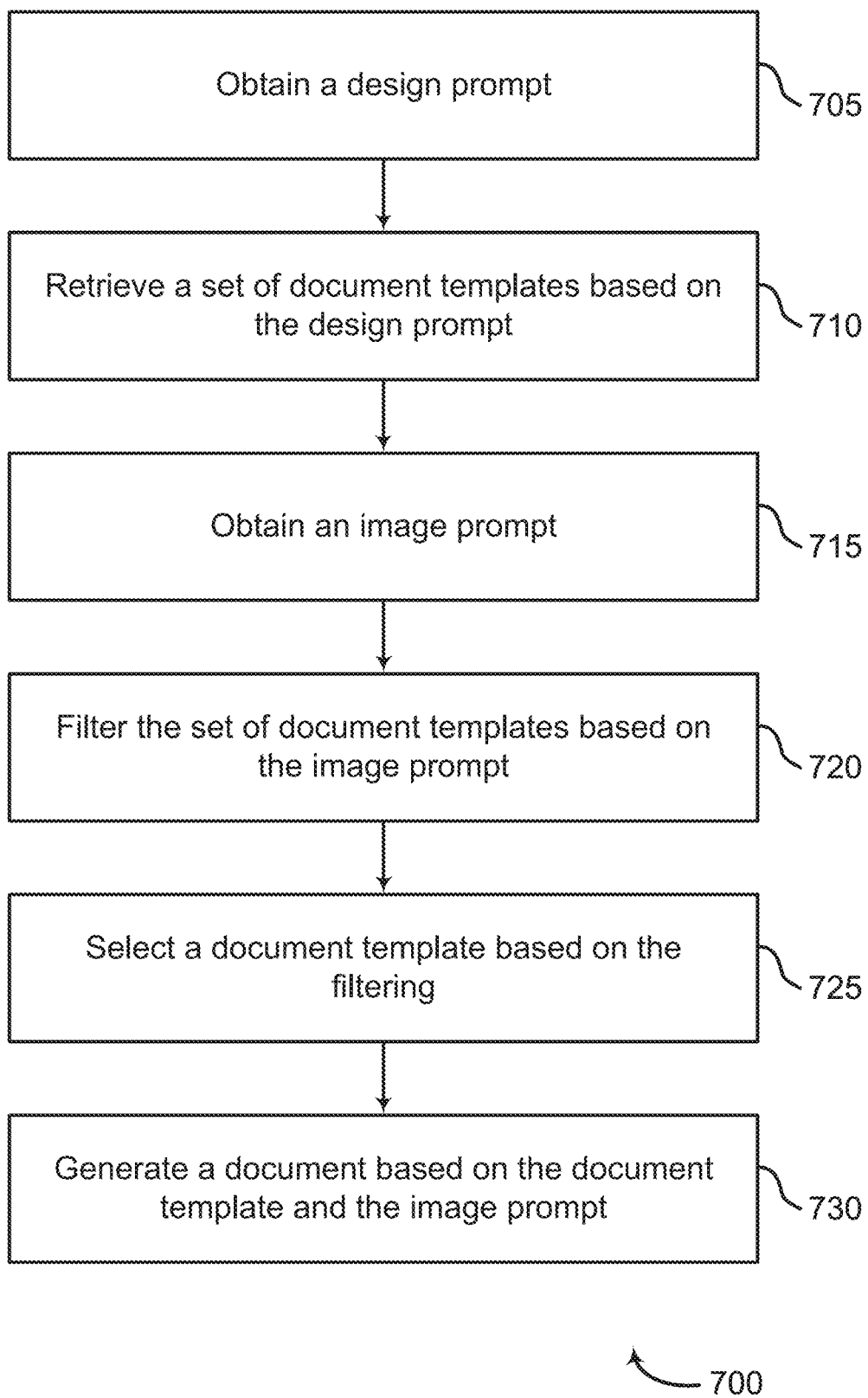
FIG. 7 shows an example of a method for document generation according to aspects of the present disclosure.

FIG. 7 shows an example of a method 700 for document generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system obtains a design prompt. In some cases, the operations of this step refer to, or may be performed by, a user interface as described with reference to FIG. 2. For example, the user interface may display a window including a text field, and prompt the user to enter a brief description describing the type of design they wish to create.

At operation 710, the system retrieves a set of document templates based on the design prompt. In some cases, the operations of this step refer to, or may be performed by, an intent component as described with reference to FIGS. 2 and 3. For example, the intent component may generate an intent embedding from the design prompt and compare the intent embedding to a plurality of document template embeddings stored in a template database to retrieve the set of document templates.

At operation 715, the system obtains an image prompt. In some cases, the operations of this step refer to, or may be performed by, a user interface as described with reference to FIG. 2. For example, the user interface may display a window including a text field or an image upload button, and prompt the user to enter a brief description that describes the content they wish to add to the template. In some cases, by contrast, the user may select a "create/upload media" button to initiate the process.

At operation 720, the system filters the set of document templates based on the image prompt. In some cases, the operations of this step refer to, or may be performed by, a filtering component as described with reference to FIGS. 2 and 3. For example, the filtering component may filter the set of document templates by a measure of saliency between the image prompt and the content contained within the document templates. According to some aspects, the filtering component further scores and re-orders the documents based on their compatibility with a user's selected document. For example, the filtering component may display document templates that have the same number of images as the selected document, or are compatible with a length of text added by the user, or other criteria. Examples of filtering criteria are provided with reference to FIGS. 2 and 3.

At operation 725, the system selects a document template based on the filtering. In some cases, the operations of this step refer to, or may be performed by, a filtering component as described with reference to FIGS. 2 and 3. For example, the system may automatically select a document that has a high saliency (e.g., high similarity score) as measured by the prompt(s) and edits provided thus far by the user.

At operation 730, the system generates a document based on the document template and the image prompt. In some cases, the operations of this step refer to, or may be performed by, a document generation component as described with reference to FIG. 2. For example, the system may incorporate the edits and the content curated by the user into a set of document templates to form generated documents and provide these generated documents to the user via the user interface.

Figure 8:
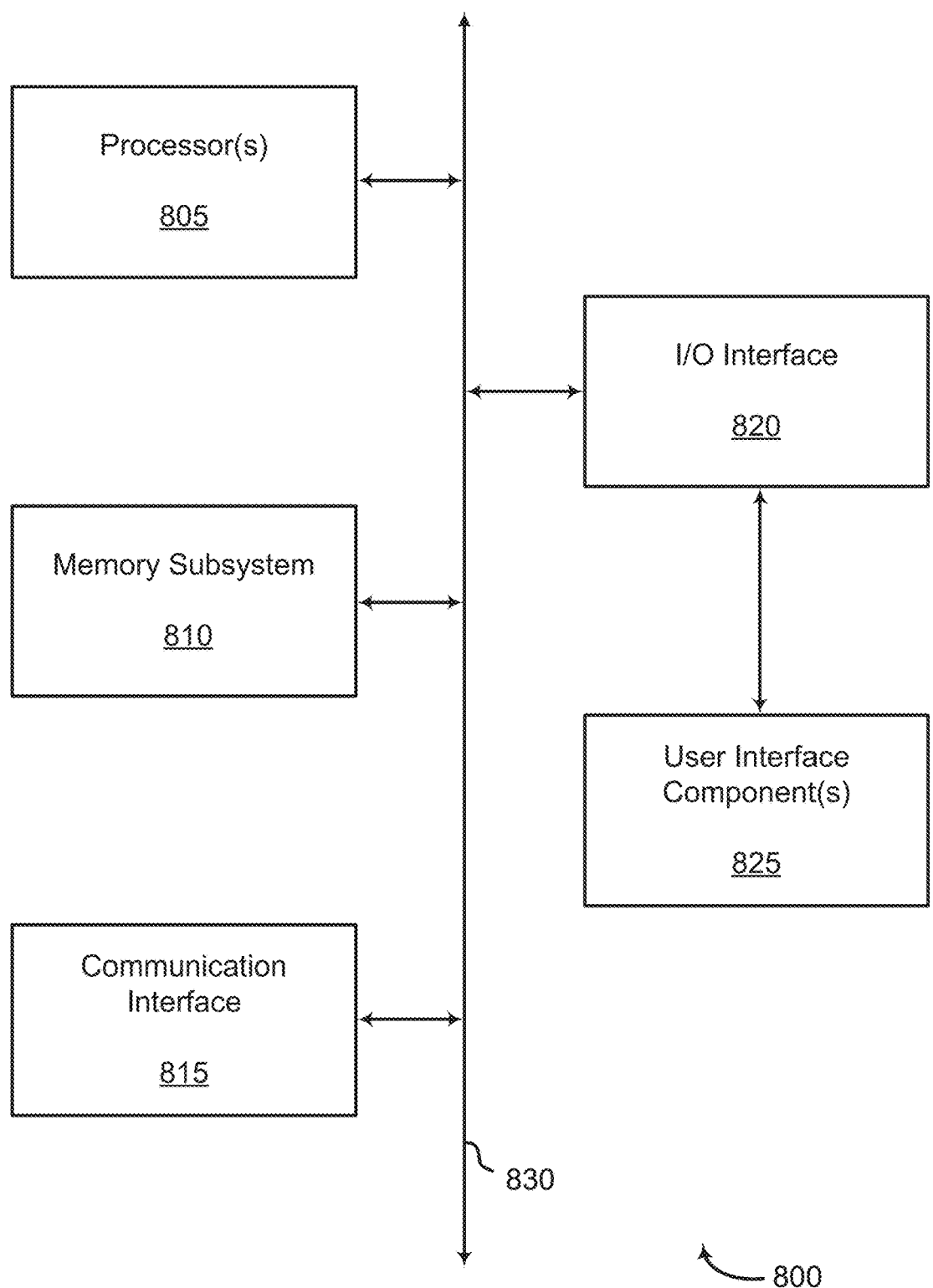
FIG. 8 shows an example of a computing device according to aspects of the present disclosure.

FIG. 8 shows an example of a computing device 800 according to aspects of the present disclosure. The example shown includes computing device 800, processor(s) 805, memory subsystem 810, communication interface 815, I/O interface 820, user interface component(s) 825, and channel 830.

In some embodiments, computing device 800 is an example of, or includes aspects of, design generation apparatus 100 of FIG. 1. In some embodiments, computing device 800 includes one or more processors 805 that can execute instructions stored in memory subsystem 810 to obtain a design prompt; retrieve a plurality of document templates based on the design prompt; obtain an image prompt; filter the plurality of document templates based on the image prompt; select a document template based on the filtering; and generate a document based on the document template and the image prompt.

According to some aspects, computing device 800 includes one or more processors 805. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 810 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 815 operates at a boundary between communicating entities (such as computing device 800, one or more user devices, a cloud, and one or more databases) and channel 830 and can record and process communications. In some cases, communication interface 815 is provided to enable a processing system coupled to a transceiver (e.g., a transmitter and/or a receiver). In some examples, the transceiver is configured to transmit (or send) and receive signals for a communications device via an antenna.

According to some aspects, I/O interface 820 is controlled by an I/O controller to manage input and output signals for computing device 800. In some cases, I/O interface 820 manages peripherals not integrated into computing device 800. In some cases, I/O interface 820 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 820 or via hardware components controlled by the I/O controller.

According to some aspects, user interface component(s) 825 enable a user to interact with computing device 800. In some cases, user interface component(s) 825 include an audio device, such as an external speaker system, an external display device such as a display screen, an input device (e.g., a remote control device interfaced with a user interface directly or through the I/O controller), or a combination thereof. In some cases, user interface component(s) 825 include a GUI.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
   retrieving a plurality of document templates based on a design prompt;
   encoding an image prompt to obtain an image prompt embedding;
   filtering the plurality of document templates by comparing the image prompt embedding to a template embedding for each of the plurality of document templates, respectively;
   selecting a document template based on the filtering; and
   generating a document based on the document template and the image prompt.

2. The method of claim 1, wherein the retrieving of the plurality of document templates further comprises:
   encoding the design prompt to obtain a design prompt embedding; and
   comparing the design prompt embedding to a template embedding for each of the plurality of document templates, respectively.

3. The method of claim 1, further comprising:
   encoding a description of a template to obtain a description embedding;
   encoding a caption of a visual element of the template to obtain a caption embedding; and
   combining the description embedding and the caption embedding to obtain the template embedding.

4. The method of claim 1, further comprising:
   receiving a text input for the document, wherein the document is based on the text input.

5. The method of claim 4, further comprising:
   generating a recommended text field based on the design prompt, wherein the text input corresponds to the recommended text field.

6. The method of claim 4, further comprising:
   sorting the plurality of document templates based on the text input.

7. The method of claim 4, further comprising:
   computing a location for the text input based on the text input and the document template, wherein the document includes the text input at the location.

8. The method of claim 1, further comprising:
   displaying the plurality of document templates; and
   receiving a selection input, wherein the document template is selected based on the selection input.

9. The method of claim 1, wherein:
   the image prompt comprises an image, and wherein the document comprises the image.

10. The method of claim 1, wherein:
    the image prompt comprises a description of an image.

11. The method of claim 10, further comprising:
    generating an image based on the image prompt, wherein the document includes the generated image.

12. A non-transitory computer readable medium storing code, the code comprising instructions executable by a processor to:
    retrieve a plurality of document templates based on a design prompt;
    encode an image prompt to obtain an image prompt embedding;
    filter the plurality of document templates by comparing the image prompt embedding to a template embedding for each of the plurality of document templates, respectively;
    select a document template based on the filtering; and
    generate a document based on the document template and the image prompt.

13. The non-transitory computer readable medium of claim 12, the code further comprising instructions executable by a processor to:
    encode the design prompt to obtain a design prompt embedding; and
    compare the design prompt embedding to a template embedding for each of the plurality of document templates, respectively, wherein the retrieval of the plurality of document templates is based on the comparison.

14. The non-transitory computer readable medium of claim 12, the code further comprising instructions executable by a processor to:
    receive a text input for the document, wherein the document is based on the text input.

15. The non-transitory computer readable medium of claim 14, the code further comprising instructions executable by a processor to:
    generate a recommended text field based on the design prompt, wherein the text input corresponds to the recommended text field.

16. An apparatus comprising:
    at least one processor;
    at least one memory including instructions executable by the at least one processor;

a template database storing a plurality of document templates;

an intent component configured to encode a design prompt to obtain a design prompt embedding, and further configured to encode an image prompt to obtain an image prompt embedding;

a filtering component configured to filter the plurality of document templates by comparing the image prompt embedding to a template embedding for each of the plurality of document templates, respectively; and a document generation component configured to generate a document based on an image prompt and a selected document template of the plurality of document templates.

17. The apparatus of claim 16, further comprising:

text field recommender configured to generate a recommended text field based on the design prompt.

18. The apparatus of claim 16, further comprising:

an image generation model configured to generate an image based on the image prompt.

\* \* \* \* \*